Aug. 26, 1952     J. A. BLAZIER     2,608,261
GEAR CASE AND DRIVE AXLE MOUNTING FOR TRACTORS
Filed Nov. 5, 1946
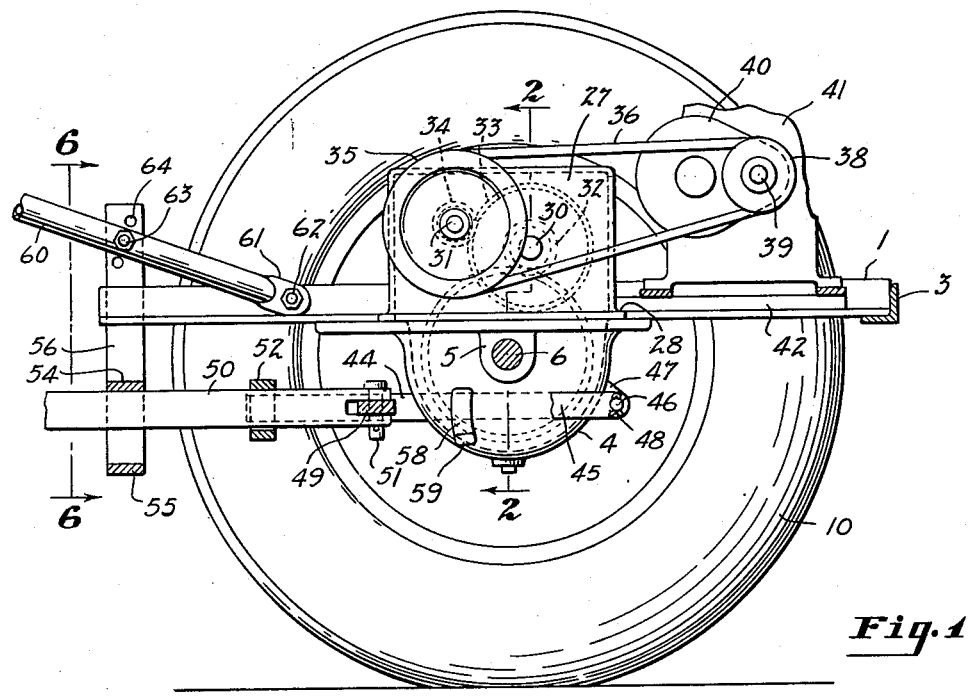
*Fig. 1*
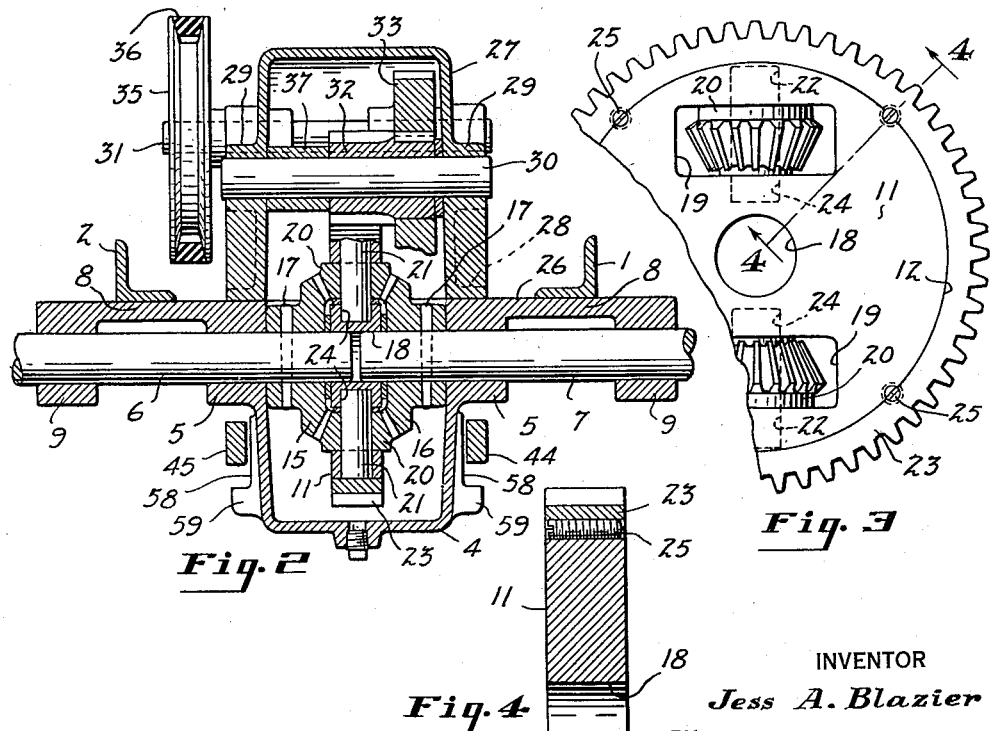
*Fig. 2*  *Fig. 3*  *Fig. 4*
INVENTOR
Jess A. Blazier
BY Evans & McCoy
ATTORNEYS Patented Aug. 26, 1952

2,608,261

UNITED STATES PATENT OFFICE 2,608,261

GEAR CASE AND DRIVE AXLE MOUNTING FOR TRACTORS

Jess A. Blazier, Cleveland, Ohio, assignor to George Knowles

Application November 5, 1946, Serial No. 707,847

4 Claims. (Cl. 180—70)

This invention relates to traction devices, and more particularly to two-wheeled tractors and the drive mechanisms therefor.

Power devices are finding increased use in small garden operations and two-wheeled tractors that are guided by persons walking behind the same are now made to perform many of the otherwise burdensome and laborious operations connected with gardening. Small tractors of this type and the implements drawn thereby preferably have a short turning radius so that all portions and corners of a garden plot can be easily reached for treatment. It is also desirable that the physical exertion required of the individual guiding the tractor be reduced to a minimum, since such devices are frequently used by persons unaccustomed to physical labor. Furthermore the motors or engines used in small tractors are usually of low power, and it is desirable that the transmission of the power from the engine to the wheels be effected as efficiently as possible and with minimum diminution on curves and turns.

It is, therefore, the principal object of the present invention to provide a small efficient tractor of the two-wheeled type which is of generally improved design and construction and has a short turning radius and can be operated with a minimum of physical exertion.

More specifically the invention aims to provide a drive for a small tractor which embodies a differential action and utilizes a small number of parts readily made and assembled and which is readily repaired and serviced.

Another object is to provide in a differential drive construction an improved design and arrangement of parts for retaining the pins that support the planetary gear or gears in assembled relation.

A still further object of the invention is to provide a generally improved tractor and drive mechanism, simple in design and operation and relatively inexpensive to manufacture. Other objects and advantages which reside in the particular combinations and arrangements of the parts will become apparent from the following detailed description of a suitable embodiment of the invention made in connection with the accompanying drawings in which:

Figure 1 is a vertical sectional view with parts broken away and parts removed taken longitudinally through a two-wheeled tractor;

Fig. 2 is a sectional detail with parts broken away and removed taken substantially on the line 2—2 of Fig. 1 and enlarged with respect to that figure;

Fig. 3 is an elevational detail with parts broken away and removed of the main rotatable driven member of the differential drive mechanism; and Fig. 4 is a sectional detail taken substantially on the line 4—4 of Fig. 3.

The tractor of the present invention, briefly described, comprises a body structure which includes a frame, a gear case, a gear case cover and related parts, together with wheels, steering handle or handles, motor or engine and a draw assembly. Referring to the drawings by numerals of reference which indicate like parts throughout the several views, the frame structure includes a pair of spaced parallel side members 1 and 2 which may be steel angle section bars that extend fore and aft and are connected at their front ends by cross member 3, also an angle section bar. Extending across the space between the central portions of the side frame members and underlying the latter is a gear case 4 which may be a steel or iron casting. This gear case has spaced generally parallel side walls in which are formed integral journals 5 that rotatably receive aligned drive shafts 6 and 7 disposed in end-to-end relation and which substantially abut one another in the center of the chamber within the gear case. On the sides of the gear case at the top thereof are integral laterally and oppositely extending outriggers 8, the outer ends of which are formed with depending journal bosses 9. These journal bosses rotatably receive outer portions of the shafts 6 and 7 and are spaced outwardly from and aligned with the journals 5 so as to support the shafts and retain the shafts in alignment.

On the outer ends of the drive shafts 6 and 7 are secured matched tractor drive wheels one of which is indicated at 10. Rotation of the shafts 6 and 7 thus serves to rotate the drive wheels of the tractor and advance the latter over the earth in the usual manner.

Within the gear case 4 the adjacent or substantially abutting ends of the shafts 6 and 7 are closely embraced by a rotatable driven member 11 which may be in the form of a circular wheel or disk having an arcuate or circular outwardly directed periphery 12. While the periphery 12 of the driven member is shown to be completely circular in extent, it is contemplated to reduce the weight of the device when so desired by removing portions of the driven member 11 along spaced portions of the periphery thereof, in which case the member is in the form of a spider.

On opposite sides of the driven member 11 bevel gears 15 and 16 are received on the shafts 6 and 7 respectively and are secured in place by transverse pins 17 which cause the shafts to turn with the gears and prevent axial shifting of the shafts relative to the gears. Each of the gears 15 and 16 is formed with a relatively long hub portion the outer end of which bears against one of the journals 5 in the gear case walls and the inner end of which bears against the rotatable member 11 about opening 18 which receives the shaft ends to prevent axial shifting of the gear and shaft assemblies.

On opposite sides of the central opening 18 in the rotatable driven member 11 are lateral or through recesses 19 which receive bevel gears 20. These gears are rotatably mounted for planetary movement about the drive shafts on radial pins 21. These pins are slidingly received and retained in radial recesses 22 and sockets 24 aligned therewith formed in the driven member 11. The recesses 22 open outwardly through the arcuate periphery 12 of the driven member 11, and it is through these outwardly directed openings of the radial recesses that the pins 21 are inserted during assembly. Each radial socket 24 is on one or the inner side of one of the through recesses 19, and one of the radial recesses 22 is on the other or outer side of such through recess.

A ring-shaped drive member or gear 23 surrounds the driven member 11 and has an inwardly directed arcuate or circular face which contacts and surrounds the periphery 12 of the driven member. The ring gear 23 overlies and acts as a closure for the openings of the radial recesses 22 so as to engage the ends of the gear supporting pins 21 and retain the pins in assembled relation in the recesses and sockets. At spaced positions about the periphery of the driven member 11, a number of retaining elements such as threaded set screws 25 are set into the meeting faces of the driven member and the ring gear 23. These set screws, when tightened into place, provide a wedging action between the contacting faces of the parts, preventing relative rotation of the ring gear on the driven member and also resisting axial shifting of the ring gear on the driven member.

The gear case 4 has a substantially flat upwardly directed top face 26 upon which is supported a hollow gear case cover 27. About the bottom peripheral edge of the gear case cover is a laterally extending flange 28 which seats on the face 26 of the gear case, the opening into the gear case cover matching the opening into the gear case so that the parts cooperatively define an enclosed chamber which houses the differential and gear drive mechanism shown.

The spaced side walls of the gear case cover are formed with integral journals 29 which receive and support cross shafts 30 and 31. A double gear mounted on the shaft 30 has a small diameter pinion portion 32 which meshes with the ring gear 23 to drive the latter. Large gear portion 33 on the shaft 30 is engaged by a small diameter pinion 34 secured on the shaft 31. On the outside of the gear case cover the shaft 31 mounts for rotation therewith a sheave 35 of the V-type which receives endless belt or band 36. Suitable spacers or sleeves such as that indicated at 37 are carried by the shafts 30 and 31 to locate the gears on the shafts and prevent axial shifting of the gears during operation.

The endless drive belt 36 is also trained around pulley 38 secured on shaft 39 which may be the output shaft of a speed reducing mechanism 40 mounted on and driven by an engine or motor 41. The engine is carried by a slide or slides 42 supported by the angle section side members 1 and 2 so that the engine can be moved toward and away from the pulley 35 to adjust the tension in the drive belt 36. Sufficient slackening of the belt permits the latter to slip on the pulley 38, thereby disconnecting the drive. Back and forth movement of the engine or motor by sliding the same on the frame of the tractor thus effects a clutching action making and interrupting the driving connection between the motor and the wheels.

The power of the tractor is transmitted in the form of a pull or hauling force to an implement such as a plow, harrow, disk cultivator or the like. The connection of the tractor to the implement is made through a draw assembly which comprises a pair of tension members 44 and 45 disposed in spaced generally parallel relation to one another and on opposite sides of the depending central portion of the gear case 4. The forward ends of the side members 44 and 45 are pivoted to the front or forward side of the gear case 4 as by a cross rod 46 received in aligned openings of bosses 47 formed integrally on the gear case. Cotter pins 48 received in holes drilled in the rod 46 retain the latter in position and are removed when it is desired to withdraw the rod for disassembly of the draw mechanism.

The side members extend rearwardly from the pivot bar or rod 46 under the shaft journal bosses 5 and are extended beyond the rear of the gear case. A cross or tie element 49 extends between and is secured at its ends to the side members 44 and 45 at the rear of the gear case. The tie element 49 is centrally embraced by the bifurcated end of a draw bar 50 which extends rearwardly therefrom and is connected to the implement, not shown. A removable pin 51 is received in aligned openings formed in the bifurcated end of the draw bar 50 and in the center of the tie element 49, securing the parts together and permitting side to side swinging movement of the draw bar with respect to the tie element and side members.

The side members 44 and 45 extend rearwardly a considerable distance (approximately one third their length or thereabouts) beyond the tie element 49 and their ends are connected by cross pieces 52 welded in place and disposed one above and one below the draw bar 50 to form a primary cage structure or arrangement for the latter.

Rearwardly of the cross pieces 52 of the above mentioned or primary cage arrangement, the draw bar 50 is surrounded by a secondary cage structure comprising top member 54, bottom member 55 and uprights 56.

Lateral loads imposed on the draw assembly, as during negotiation of a curved path by the tractor drawing an implement, are transmitted by the draw assembly to integral cheek pads 58 formed or cast on the side walls of the gear case 4, adjacent the rear thereof. The side members 44 and 45 of the draw assembly are slidable up and down on the cheeks 58, the downward movement being limited by integral lateral extensions 59 on the pads which support the side members of the draw assembly when the draw bar 50 is removed.

As previously mentioned, the tractor is manipulated and guided by an operator who walks behind or to one side of the implement. The operator governs the tractor through a handle or handles 60 which may be formed of a steel pipe bent to U shape. The ends of the pipe are flattened at 61 and receive bolts 62 which secure the handle ends to the upright flanges of the angle frame members 1 and 2 at points rearwardly of the outriggers 8 of the gear case. Portions of the handle pipe 60 spaced from the flattened ends 62 thereof are secured as by bolts 63 to extension portions of the cage uprights 56. A number of openings 64 spaced along the uprights 56 selectively receive the handle bolts 63 so that the pipe handles 60 can be raised or lowered to a convenient position for the operator.

The principles of the present invention may be utilized in various ways, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. In combination in a tractor type vehicle having spaced, generally horizontal frame members, a hollow gear case comprising separable upper and lower sections disposed between the frame members, lateral outrigger extension members on and secured to opposite sides of the lower section, said outrigger extension members being disposed wholly below and secured to the frame members, journals spaced from the gear case and secured on the ends of the lateral extensions, said journals depending from the outrigger extensions and being wholly on the outside of the frame members, shafts guided in the journals and extending beneath and external to the outrigger extension members into the lower section of the gear case in aligned relation, a rotary member in the lower gear case section, means drivingly connecting the rotary member with each of the shafts, a drive shaft journaled in the upper casing section, means drivingly connecting the upper shaft and the rotary member, and means for actuating the drive shaft.

2. In combination in a tractor type vehicle having spaced, generally horizontal frame members, a hollow gear case comprising separable upper and lower sections disposed between the frame members, lateral outrigger extension members on and secured to opposite sides of the lower section, said outrigger extension members being disposed wholly below and secured to the frame members, journals spaced from the gear case and secured on the ends of the lateral extensions, said journals depending from the outrigger extensions and being wholly on the outside of the frame members, shafts guided in the journals and extending beneath and external to the outrigger extension members into the lower section of the gear case in aligned relation, a rotary gear member carried by the shafts in the lower section of the gear case and drivingly connected to the shafts, a shaft supported in the upper casing section, a gear on the last named shaft and meshed with the rotary gear member, and means for actuating the last named gear.

3. In combination in a tractor type vehicle having spaced, generally horizontal frame members, a hollow gear case comprising separable upper and lower sections disposed between the frame members, lateral outrigger extension members on and secured to opposite sides of the lower section, said outrigger extension members being disposed wholly below and secured to the frame members, journals carried by the lateral extension members in spaced relation to the gear case, said journals depending from the outrigger extensions and being wholly on the outside of the frame members, the frame members being secured to the tops of the lateral extensions intermediate the lower gear case section and the journals, shafts guided in the journals and extending beneath and external to the outrigger extension members into the lower section of the gear case in aligned relation, a rotary member in the lower gear case section, means drivingly connecting the rotary member with each of the shafts, a drive shaft journaled in the upper casing section, means drivingly connecting the upper shaft and the rotary member, and means for actuating the drive shaft.

4. In combination in a tractor type vehicle, a frame comprising spaced generally horizontal members disposed substantially in a common plane, a hollow gear case disposed between the frame members and comprising separable upper and lower sections, outriggers secured to opposite sides of the lower case section and extending in opposite directions beneath the horizontal frame members, the frame members being secured to and supported on the tops of the outriggers, journals depending from the ends of the outriggers in spaced relation to the gear case section sides to which the respective outriggers are secured, the journals being spaced apart further than the frame members, the lower case section, the outriggers and the journals all being wholly below the plane of the frame members, a journal in each of said opposite sides of the lower case section and spaced from one of the first mentioned journals carried by the outrigger on the same case section side, a pair of axially aligned shafts extending into the interior of the gear case through the case section journals, outer portions of the shafts being received through the depending journals and extending beyond the latter for mounting wheels, the outriggers being disposed in overlying shielding relation to portions of the shafts exposed between the case section journals and the depending journals, a rotary member in the lower gear case section, means drivingly connecting the rotary member to each of the shafts, a drive shaft journaled in the upper casing section, means drivingly connecting the upper shaft and the rotary member, and means supported by the frame members independently of the gear case for actuating the drive shaft.

JESS A. BLAZIER.

REFERENCES CITED

The following references are of record in the file of this patent:

UNITED STATES PATENTS

| Number | Name | Date |
|---|---|---|
| 648,210 | Kidder | Apr. 24, 1900 |
| 702,747 | Saxon | June 17, 1902 |
| 724,393 | Lindsay | Mar. 31, 1903 |
| 822,236 | Ball | June 5, 1906 |
| 999,876 | Ross | Aug. 8, 1911 |
| 1,164,870 | Rosenberg | Dec. 21, 1915 |
| 1,239,990 | Ware | Sept. 11, 1917 |
| 1,242,141 | Carver | Oct. 9, 1917 |
| 1,318,132 | Carll | Oct. 7, 1919 |
| 1,618,040 | Algrain | Feb. 15, 1927 |
| 1,648,429 | Tracy et al. | Nov. 8, 1927 |
| 1,654,417 | Foley | Dec. 27, 1927 |
| 1,702,747 | Quigley | Feb. 19, 1929 |
| 1,735,719 | Baker | Nov. 12, 1929 |
| 1,906,613 | Keese | May 2, 1933 |
| 1,916,704 | Willett et al. | July 4, 1933 |
| 2,260,344 | Shaw | Oct. 28, 1941 |
| 2,401,796 | Raitch | June 11, 1946 |
| 2,402,743 | Firth | June 25, 1946 |

FOREIGN PATENTS

| Number | Country | Date |
|---|---|---|
| 2,557 | Great Britain | Mar. 9, 1905 |